United States Patent [19]
Nakamura et al.

[11] Patent Number: 5,217,542
[45] Date of Patent: Jun. 8, 1993

[54] METHOD FOR PRODUCING SURFACE-TREATED MAGNETIC POWDER

[75] Inventors: Eitaro Nakamura; Katsuya Nakamura, both of Tokyo, Japan

[73] Assignee: Nippon Zeon Co., Ltd.

[21] Appl. No.: 631,484

[22] Filed: Dec. 11, 1990

[30] Foreign Application Priority Data

Dec. 11, 1989 [JP] Japan ................................. 1-320890

[51] Int. Cl.$^5$ ............................................ H01F 41/00
[52] U.S. Cl. .................................. 148/105; 252/62.54
[58] Field of Search ............................. 148/104, 105; 252/62.54

[56] References Cited

U.S. PATENT DOCUMENTS

| | | | |
|---|---|---|---|
| 3,943,012 | 3/1976 | Tamai et al. | 148/105 |
| 4,096,316 | 6/1978 | Tamai et al. | 148/105 |
| 4,152,485 | 5/1979 | Mizumura et al. | 252/62.54 |
| 4,197,347 | 4/1980 | Ogawa et al. | 148/105 |
| 4,253,886 | 3/1981 | Aonuma et al. | 148/105 |
| 4,594,174 | 6/1986 | Nakayama et al. | 252/62.54 |
| 4,600,521 | 7/1986 | Nakamura et al. | 252/62.54 |
| 4,623,405 | 11/1986 | Tamai | 148/105 |
| 4,748,084 | 5/1988 | Hata et al. | 252/62.54 |
| 4,797,324 | 1/1989 | Hata | 252/62.54 |
| 5,063,119 | 11/1991 | Ishida et al. | 252/62.54 |
| 5,091,268 | 2/1992 | Nishikawa et al. | 252/62.54 |

Primary Examiner—George Wyszomierski
Attorney, Agent, or Firm—Wenderoth, Lind & Ponack

[57] ABSTRACT

This invention relates to a method for producing surface-treated magnetic power for high record density magnetic recording medium which has excellent dispesibility and high filling density and surface smootheness.

This invention provides a method for producing surface-treated magnetic powder characterized by treating magnetic powder with at least one functional group of the epoxy group, carboxyl group, hydroxyl group, thiol group and amino group and with hydrocarbon group having more than eight methylene chains.

13 Claims, 1 Drawing Sheet

METHOD FOR PRODUCING SURFACE-TREATED MAGNETIC POWDER

FIELD OF THE INVENTION

This invention relates to a method for producing surface-treated magnetic powder. More specifically, it relates to a method for producing magnetic powder materials for high recording density magnetic record medium with high filling density and surface smoothness.

PRIOR ART

Conventionally, magnetic record medium are generally produced by coating magnetic paint, including magnetic powder, binders, and other various additives, on nonmagnetic substrates such as polyester films and polyimido films.

During recent years, magnetic tapes as such magnetic record medium, with thin-film magnetic layer having high coercive force and layer residual magnetic flux density as well as outstanding surface properties have become required. In order to obtain such magnetic layers, it is necessary to disperse to a high degree fine magnetic powder materials with high surface area having a high coercive force and saturated magnetizing quantities and coating it evenly and thinly to achieve a highly oriented and filled magnetic layer.

To meet the demand for such magnetic powder and magnetic layers, it is effective to use fine metallic magnetic powder as such, but the metallic magnetic powder is apt to be degraded due to oxidization. To overcome this problem, the surface of the magnetic powder is subject to a deoxidization treatment. However, the finer the magnetic powder becomes, the more difficult it becomes to achieve a compromise with the reduction in saturated magnetizing quantity due to such oxidization process.

In ferrous oxide magnetic powder, on the other hand, cobalt-adhered iron with high coercive force and highly saturated magnetizing properties is extensively used for ½ inchi video tape, but there is a limit to increasing both the coercive force and saturated magnetizing quantity. Moreover, since this material is an oxide, it has no electrical conductivity, and the magnetic layer obtained by dispersing it to a high degree possesses no light-intercepting properties and offers a large surface electrical resistance. For this reason, this problem has been normally solved by mixing nonmagnetic electrical conductive light-intercepting, including carbon black into the magnetic layer. Such mixing of these non-magnetic results in the lowering of the magnetic material ratio, making it difficult to obtain high bulk magnetic layers having high saturated flux density.

In order to provide a thin magnetic layer having high residual magnetic flux density and excelling in orientation and surface properties, it becomes necessary to disperse magnetic powder to a high degree and to adequate adjust for use in a magnetic paint with high magnetic powder density and sufficiently low viscosity. The more difficult it becomes to meet this requirement, the finer the magnetic powder becomes. No technological means have been established to meet such problem.

To achieve high dispersion of magnetic powder in paint and to reduce the viscosity of the paint, a dispersant with low molecular weight, such as fatty acid and surface active agent has been employed. But it offers poor dispersion stability, and the large amount of the disperants used decreases the strength of the magnetic layers and soudges magnetic heads.

SUMMARY OF THE INVENTION

The present invention has been made in consideration of the aforestated circumstances. It has the objective of providing a new method for producing a surface-treated magnetic powder which solves the problems associated with conventinal magnetic powder and the paint to be applied on it, increases the dispersion properties of the magnetic powder, posesses low paint viscosity, and provides a magnetic record medium with a high residual magnetic flux density and a low surface electrical resistance and gives a high S/N ratio.

The present invention provides a method for producing magnetic powder with a treated surface and which is characterized by treating magnetic powder with a chemical compound having at least one functional group among the epoxy group, carboxyl group, hydroxyl group, thiol group, and amino group, and hydrocarbon group with more than eight methylene chains.

More specifically, the present invention makes it a desirable embodiment to treat the powder at an oxygen partial pressure of less than 10 mmHg and a temperature between 120° and 250° C.

Figure 1:
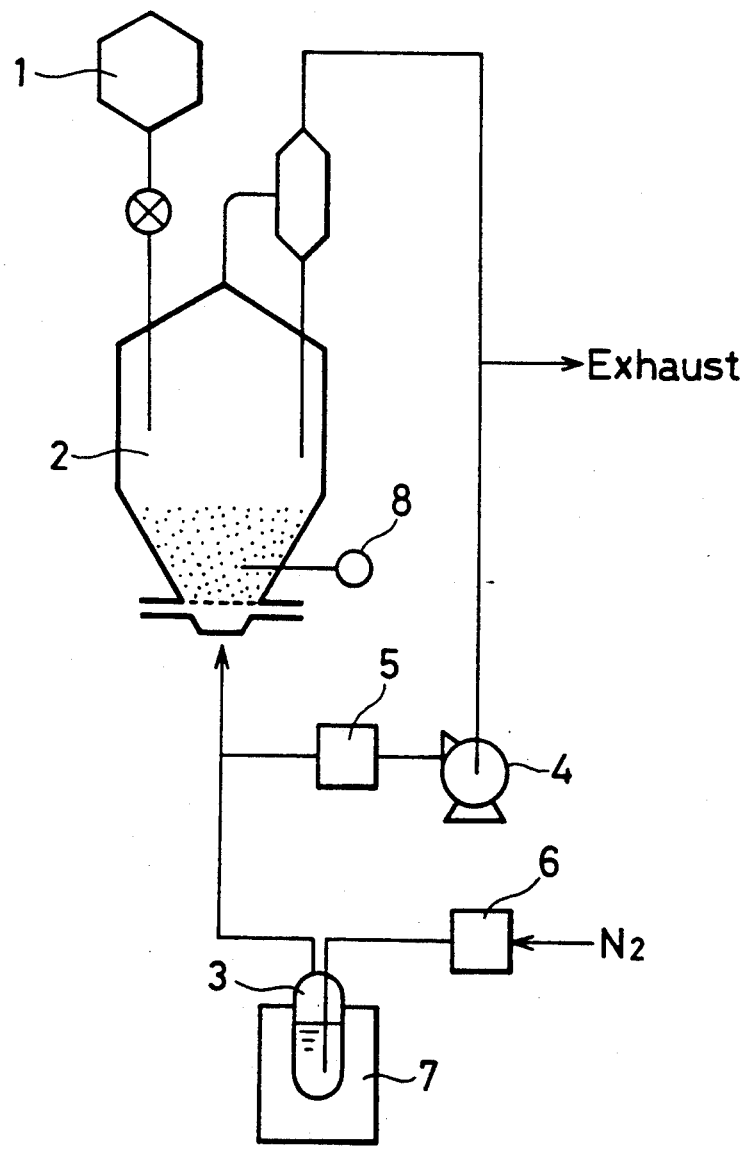
FIG. 1 is a conceptional drawing of a system for a fluidizing phase treatment showing one of the embodiments of the present invention. The numbers in the drawing indicate the following.

1. raw material tank
2. fluidizing vessel
3. treatment chemical compound vessel
4. air blower
5. 6,7 heaters
8. thermometer

DETAILED DESCRIPTION OF THE INVENTION

As the magnetic powder covered by the method of production according to the present invention, not only those already known but also those arbitrarily chosen can be used, including oxide magnetic powder, such as $Fe_2O_3$, $FeO_x$ ($1.33<x<1.5$), $Fe_3O_4$, Co-adhered $\gamma$-$Fe_2O_3$, Co-adhered $FeO_x(1.33<_x<1.5)$, Co-adhered $Fe_2O_3$, barium ferrite, strontium ferrite and $CrO_2$ powder, and metallic powder such as Fe powder, Co powder, and Fe-Ni alloy powder. The particle shape can be needle-, palte-, particle-, rice grain-shapes and any other arbitrary shapes.

Among these, a powder with a small particle size and large specific relative surface area due to the nitrogen adsorption method (for instance, 40 to 100 m$^2$/g) and cobalt-adhered iron oxide magnetic powder are useful for their marked effect.

The chemical compounds that treat these magnetic powder, i.e., those having at least one functional group selected from epoxy group, carboxyl groups, hydroxyl group, thiol groups and amino groups and hydrocarbon group with eight or more methylene chains, can include α-olefin oxides containing 10 to 30 carbons, such as 1,2-epoxydodecane and 1,2-epoxyhexadecane, epoxidated unsaturated higher alcohol and epoxidated unsaturated higher fatty acid, such as epoxidated oleyl alcohol, epoxidated-1-undecenol, and epoxidated oleinic acid, saturated and unsaturated fatty acids, such as lauric acid, myristic acid, plamitic acid, oleic acid, stearic acid and 10-undecanic acid, keto acid, such as 2-ketolauric acid and 8-ketostesric acid, oxyacid, such as ω-hydroxylauric acid, ω-hydroxypalmitic acid, ferronic acid and hydroxystearic acid, lauryl alcohol, stearyl alcohol, oleyl alcohol, 10-undocenol-1, nonanediol, 2-hydroxyethyl lauric acid ester, dodecyl mercaptan, dodecyl bnezene thiol, amino acid, such as amino stearic acid and α-amino lauric acid, stearyl amine, dimetyl stearyl amine, distearyl amine, methyl di-stearyl amine, and amino stearyl alcohol.

Of these compounds their functional group is considered to react with the active site on the magnetic powder surface, but if they have two or more functional groups, at least one functional group reacts with the surface of magnetic powder, and the other group racts with the bridging agent in magnetic paint, forming strong magnetic layers. Hence, the latter case is more preferred.

The methylene chain portion is effective in weakening the interaction among magnetic powder, and lowering the viscosity and yield value of magnetic paint.

It is preferable to use these compounds in 0.2 to $2.0 \times 10^2$ g/m$^2$ depending on the BET surface area of magnetic powder. If the amount of the compound is less than the above range of quantity, it becomes difficult to achieve the effect intended by this invention. On the contrary, if the amount exceeds the range, a greater proportion of the compound does not react and remain, causing indesirable effects due to lower dispersion stability, softening of magnetic layers, and seepage of the residual compound into the surface of the magnetic layer.

It is prefered that the treatment of magnetic powder with these compounds be performed under low oxygen atmosphere where oxygen partial pressure is controlled, particularly under an oxygen partial pressure of 10 mmHg or below. If the oxygen partial pressure is too high, it becomes difficult to obtain the effect of the present invention.

The oxygen partial pressure can be controlled by replacing oxygen in the treatment device with gases other than oxygen, or reducing the pressure inside the device. Given the fact that gases occur from the magnetic powder due to the reaction during a treatment operation, it is desirable to perform constant exhaust operations in the reaction system, and invariably supply gases other than oxygen to the reaction system.

The treatment temperatures should generally be between 120° and 250° C. Where the temperature are lower than 120° C., the treatment is less of effective, and where it is higher than 250° C., dispersibility is reduced due to the decomposition of the coumpounds to be treated.

As the units for treatment of the magnetic powder, a pressure-resistant stirring bath with jacket, a pressure-resistant kneader, a continuous kneader and a fluidizing reactor can be used.

Moreover, in the method of production according to the present invention, it is desirable to cool the magnetic powder after subjecting it to the foregoing treatment, under a atmosphere where the oxygen partial pressure is controlled, purticularly near room temperatures at 10 mmHg.

By the production method according to the present invention, the dispersibity of the magnetic powder can be increased substantially by treating the magnetic powder with the compounds as specified above.

For this reason, the magnetic paint obtained by dispersing and preparing magnetic powder materials according to this invention has a low viscosity, outstanding paint applicability, and further the magnetic paint coating film obtained by applying this paint to nonmagnetic body film, and treating it with orientation, drying, and calendar achieves high orientation, large residual magnetic flux density and smooth evenly surfaces.

High coercive force and light interruption properties as well as low surface electrical resistance have been achieved according to the present invention.

Now, a more detailed descriptions will be made as to the production method of this invention while illustrating specific embodiments. It is needless to say that this invention is not confined by the following examples.

The expressions, "part" and "%" as in the following explanations indicate the weight standard.

TREATMENT WITH MAGNETIC POWDER MATERIALS

Example 1

100 part cobalt-adhered iron oxide magnetic powder (BET surface area 30 m$^2$/g, antimagnetic force 650 Oe) and 2.5 aprt α-olefin oxide ($C_{16}/C_{18}=1/1$ straight chain) are put into a vacuum stirring bath with a jacket, the in-bath pressure is reduced to 25 mmHg, then a stirring operation is carried out to increase the temperature inside the bath.

The in bath temperature reaches 230° C., where it is kept there for one hour, then it is cooled. During this, the in-bath pressure is kept at 5 to 8 mmHg. After the bath is sufficiently cooled, the magnetic powder was taken out. Methanol was extracted from this magnetic powder material for eight hours using a Soxhlet extractor. The amount of methanol extracted was 0.2%.

Example 2

Except using oleyl alcohol in place of α-olefin oxide, the magnetic powder treated was extracted.

Example 3

Using hexagonal plane barium ferrite magnetic powder (BET surface area 35.5 m$^2$/g, antimagnetic force 454 Oe) as magnetic powder, the treated magnetic powder was obtained in the same manner as in Example 1.

Example 4

Except for using α-amino lauric acid in place of α-olefin oxide, the magnetic powder treatment was obtained.

Example 5

Metallic magnetic powder (surface area 61 m$^2$/g, antimagnetic force 1570Oe) was treated with epoxidated oleyl alcohol at a fluidizing treatment device as shown in the attached figure.

To put in another way, the metallic magnetic powder from the raw material tank (1) was treated with the epoxidated oleyl alcohol steam supplied with nitrogen gas flow from the treatment chemical compound vessel (3) at the fluidizing vessel (2) at approx. 200° C. Nitrogen was circulated with the air blower (4), and heated with the heaters (5), (6) and (7) in order to keep the temperature constant. The reaction temperature is measured with a thermometer (8) as temperatures in the fluidizing vessel (2).

After continuously treated and cooled in nitrogen gas flow, the treated magnetic powder was taken out.

The oxygen partial pressure in gas flow at the inlet of the fluidizing floor vessel (2) was found to be less than 0.7 mmHg (measurement limit), and the consumption of epoxidated oleyl alcohol to be 3.2 g/100 g magnetic powder.

Comparison example 1

Without using α-olefin oxide, magnetic powder was obtained similar to Example 1.

μm, oriented and dried to give a magnetic paint film. The paint film was measured in terms of glossness, magnetic character lattice and total light transmission rate.

The result is shown in Table 1.

As is apparent from Table 1, the magnetic powder treated by the treatment procedure according to this invention offers outstanding dispersibility and low paint viscosity, and also achieves high residual magnaetic flux density, high filling ratio, and excellent orientation properties. The paint film shows low electrical resistance and light transmissivity.

TABLE 1

| Sample magnetic powder | Example 1 | Example 1 | Example 2 | Comparison example 1 | Comparison example 2 | Comparison example 3 | Comparison c) example 4 |
|---|---|---|---|---|---|---|---|
| Binder | | | | | | | |
| VYHH a) | ⊚ | | | ⊚ | ⊚ | ⊚ | |
| MR-110 b) | | ⊚ | ⊚ | | | | ⊚ |
| Paint viscosity (CPS) | 600 | 900 | 850 | | | 4200 | 1200 |
| Gloss of paint film (%) | 56 | 98 | 96 | | | 3 | 92 |
| Saturation magnetic flux density Bm (Gauss) | 1447 | 1512 | 1502 | | | 1100 | 1210 |
| Residual magnetic flux density Br (Gauss) | 1199 | 1266 | 1250 | d) | d) | 880 | 940 |
| Rectangular ratio Rs (—) | 0.83 | 0.84 | 0.84 | | | 0.71 | 0.82 |
| Anti-magnetic force Hc (Oe) | 730 | 744 | 738 | | | 621 | 630 |
| Specific resistance of paint film surface (Ω) | $2 \times 10^9$ | $3 \times 10^9$ | $3 \times 10^9$ | | | $2 \times 10^{10}$ | $2 \times 10^{10}$ |
| Total light transmission rate (%) | 0 | 0 | 0 | | | 0.5 | 1.0 |

(Note)
a) Made by Union Carbide. Vinyl chloride acetic acid polymer
b) Made by Nippon Zeon. Vinyl chloride co-polymer containing $SO_nK$
c) Co-adhered iron oxide magnetic powder used in Example 1. Where VYHH is used as the binder, the powder did not disperse and so did not become paint.
d) Does not disperse, and so does not become a paint

Comparison example 2

In place of α-olefin oxide, 125 parts of 2% solution of metyl ethyl ketone was mixed with 100 parts of cobalt-adhered iron oxide magnetic powder (the same as used in Example 1), and the methyl ethyl ketone was allowed to evaporate and dried to give treated magnetic powder.

Comparison example 3

Without reducing pressure in the stirring bath, the magnetic powder treated was obtained by the same procedure as in Example 1 except the state where air is released.

PREPARATION & COATING OF MAGNETIC PAINT

Using the magnetic powder as obtained in the foregoing examples where the surface has been treated and the magnetic powder as indicated in the comparison examples, the magnetic paint was prepared by dispersing the material of the following composition for two hours with a paint conditioner, then it was diluted with 50 parts of a mixed solution and dispersing for five minutes;

| Magnetic powder | 100 parts |
|---|---|
| Binder | 10 parts |
| Mixed solvent | 150 parts |

(Methyl ethyl ketone:methyl isobutyl ketone:-toluene=2:1:1)

For the magnetic paint obtained, the paint viscosity was measured with the Brockfield rotary viscosity meter. On the the other hand, magnetic paint was applied onto a polyester film so that it has a dry thickness of 4

PREPARATION OF VIDEO TAPE

Preparation Example 1

Using the surface-treated magnetic powder (Co-adhered iron oxide magnetic powder) obtained in Example 1 and untreated magnetic powder, a video tape was prepared in the following procedure;

Namely, a compound of the following composition was mixed in a kneader by using mixed solvents in two parts, 30 part of mixed solvents were added, and the whole mixture was dispersed in a sand mill.

| Magnetic powder | 100 parts |
|---|---|
| Binder (MR-110) | 10 parts |
| Carbon black | 1 part |
| Alumina | 4 parts |
| Myristic acid | 1 part |
| Mixed solvent | 80 parts |

(Methyl ethyl ketone:cyclohexanone:toluene=1:1:1)

Then, the following substance was added to the mixture.

| Silicon Oil | 1.5 parts |
|---|---|
| Mixed solvent | 42 parts |

The mixture was finally allowed to disperse, 4 parts of COLONATE (made by Nippon Polyurethane, TDI trimethylpropane adduct) and 30 parts of mixed solvent, and mixed with a disper to prepare magnetic paint.

After passed through a filter, it was coated onto a polyester film so that it has a dry thickness of 0.4 μm, is oriented and dried, then it was pressed eight times with a calendar roll to form the surface, and cured at 60° C.

for 24 hours. Then, it was cut to a width of ½" and wound into a VHS cassette to make a video tape.

The characteristics of the tape from the surface-treated magnetic powder treated in Example 1 were as follows:

| | |
|---|---|
| Saturation magnetic flux density (Bm) | 1804 Gauss |
| Residual magnetic flux density (Br) | 1610 Gauss |
| Rectangular ratio | 0.89 |
| Anti-magnetic force | 740 Oe |
| Surface electrical resistance | 6 × 10$^8$ Ω/sq |
| Electromagnetic conversion characteristics | +1.3 dB |

On the other hand, oven though attempts were made to take measurements of electromagnetic conversion characteristics, the tape would not be fed, thus rendering the measurements impossible. This was due to the fact that the light transmission rate of the tape was large enough to trigger the automatic stop mechanism of the deck.

As is evident from the above result, in the case of the magnetic powder produced by the method according to the present invention, though the proportion of carbon black is limited, the capacity of the tape to interrupt light is high, increasing the filling ratio of the magnetic powder materials.

Preparation example 2

The hexagonal plate form barium ferrite treated with the surface-treated magnetic powder in Example 3, used by α-olefin oxide, was dispersed in the following composition with paint conditioner for 180 minutes, then 100 part mixed solvent was added to allow the mixture to be dispersed and diluted for 30 minutes to provide magnetic paint.

| | |
|---|---|
| Magnetic powder | 100 parts |
| Binder (MR-110) | 10 parts |
| Mixed solvent | 135 parts |

This paint was applied on polyester film so that it had a dry thickness of 4 μm, and was dried to give a magnetic paint film. The characteristics were measured. A comparison with when the magnetic powder was untreated, is illustrated in Table 2.

It is shown that dispersibility has been improved with the surface-treated magnetic powder according to this invention.

Preparation example 3

The magnetic powder obtained in Example 5 was also dispersed in the same composition as described above with a paint conditioner (for 90 minites), and 70 parts of MR-110 12.5% mixed solvent solutions were added to them. The mixture was dispersed for 90 minutes, and another 75 parts of mixed solvents were added to allow the mixture to be diluted and mixed for 30 minutes.

The paint obtained was coated onto polyester film so that it has a dry thickness of 4 μm, was oriented and dried to give a magnetic paint film.

After the magnetic characteristics of the film was measured, it was allowed to stand for one week under conditions of 60° C.×90% RH, then the magnetic characteristics were measured again.

When the ratio of reduction in the saturated magnetic flux density (BM/Bn) was evaluated, it turned out to be 0.034.

When a similar evaluation was made on an untreated metallic magnetic powder, the reduction ratio proved to be 0.129. This indicates that the magnetic powder according to this invention offers excellent weather-resistant storage stability.

TABLE 2

| Sample magnetic powder | Example 3 | Example 3 Untreated |
|---|---|---|
| Gloss of paint film (%) | 104 | 94 |
| Magnetic characteristics (vertical direction) | 1394 | 1250 |
| Saturated magnetic flux density (Bm) (Gauss) | | |
| Residual magnetic flux density (Br) (Gauss) | 551 | 372 |
| Rectangular ratio (Rs) | 0.40 | 0.30 |
| Anti-magnetic force (Hc) (Oe) | 830 | 525 |
| S F D | 2.17 | 3.67 |

As has been detailed above, the present invention provides magnetic powder that has excellent dispersibility.

The magnetic powder dispersed and prepared using this magnetic powder offers low viscosity, and good paint workability. The paint film prapared by this paint has high orientation and resudual magnetic flux density, and an even smooth surface, as well as high coersive force and light-interrupting propersses and low surface electrical resistance.

For this reason, magnetic tapes with outstanding characteristics and durability can be achieved without mixing a high proportion of carbon black as is usually the case.

We claim:

1. A method for producing surface-treated magnetic powder comprising contacting magnetic powder with an organic compound having at least eight methylene chains selected from the group consisting of epoxides, alcohols, epoxylated alcohols, amino alcohols, carboxylic acids, epoxylated carboxylic acids, and amino carboxylic acids, at a temperature and time sufficient to react the functional groups of the organic compound with the surface of the magnetic powder.

2. A method for producing magnetic powder as described in claim 1 wherein said powder is contacted at an oxygen partial pressure of 10 mmHg and below.

3. A method for producing magnetic powder as described in claim 2 wherein said powder is contacted at a temperature from 120° to 250° C.

4. A method for producing magnetic powder as described in claim 3 which comprises uniformly mixing the magnetic powder with the organic compound so as to essentially react the entire surface of said magnetic powder with said organic compound.

5. A method for producing magnetic powder as described in claim 3 in which the organic compound is in the form of a gas such that a gaseous/solid state reaction is carried out.

6. A method according to claim 3 in which the contact is carried out at a partial pressure of less than 10 mmHg.

7. A method for producing magnetic powder as described in claim 1 wherein said powder is contacted at a temperature from 120° to 250° C.

8. A method for producing magnetic powder as described in claim 1 which comprises uniformly mixing the magnetic powder with the organic compound so as to essentially react the entire surface of said magnetic powder with said organic compound.

9. A method for producing magnetic powder as described in claim 1 in which the organic compound is in the liquid phase such as to effect a solid/liquid phase reaction.

10. A method for producing magnetic powder as described in claim 1 in which the functional group of the organic compound is an epoxy group.

11. A method for producing magnetic powder as described in claim 1 in which the functional group of the organic compound is a carboxyl group.

12. A method for producing magnetic powder as described in claim 1 in which the functional group of the organic compound is a hydroxyl group.

13. A method for producing magnetic powder as described in claim 1 in which the functional group of the organic compound is an amino group.

* * * * *